United States Patent Office 3,606,753
Patented Sept. 21, 1971

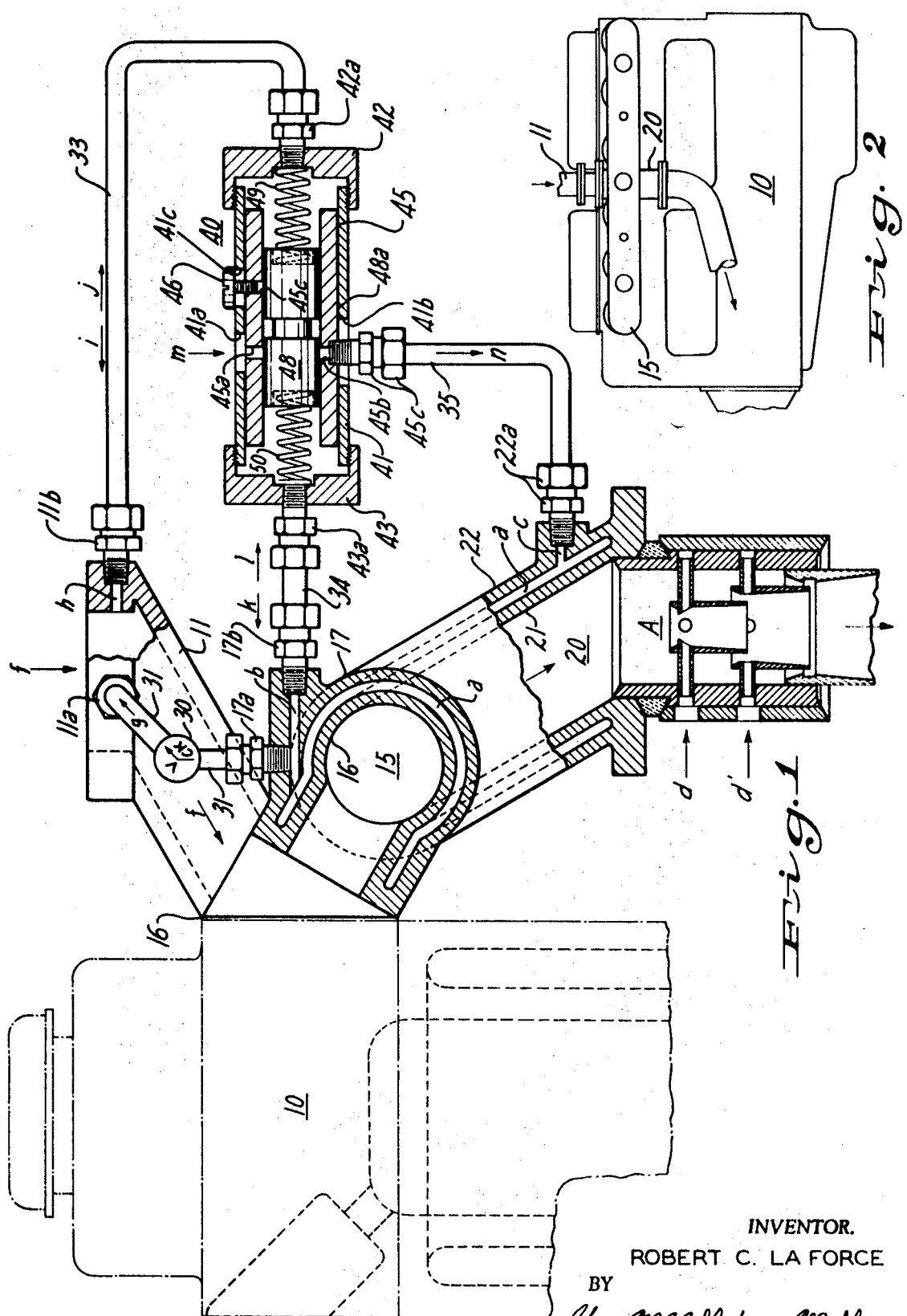

3,606,753
AIR POLLUTION SYSTEM TEMPERATURE
CONTROL
Robert C. La Force, West View Drive, R.D. 1,
Beaver, Pa. 15009
Filed Sept. 8, 1969, Ser. No. 856,027
Int. Cl. F01n 3/10; F28f 13/00
U.S. Cl. 60—30            10 Claims

ABSTRACT OF THE DISCLOSURE

A method and apparatus are provided for maintaining the temperature of hot gases being exhausted from an internal combustion engine within a controlled range for assuring a maximized thermal reacting of hydrocarbons and carbon monoxide with a minimized production of nitrogen oxides before discharge into the atmosphere. The mtehod and apparatus employ fluid-jacketing of an exhaust manifold and a valve system operatively-connected between the jacketing and an intake manifold to supply air to the jacketing to reduce the temperature of the exhaust gases when the engine is operating under full or heavy load and to withdraw air and provide a maximized insulating effect when the engine is operating under a low load or is idling.

---

The invention pertains to heat resident control and particularly, to air pollution control for internal combustion engines, such as automotive vehicles, for maintaining a desirable mediate temperature of exhaust gases to which air is being introduced for after-oxidizing action before the gases are exhausted to the atmosphere.

A phase of the invention deals with the problem of maintaining an effective temperature of gases being exhausted from an internal combustion engine that is conducive to a maximum reduction of noxious hydrocarbon and carbon monoxide gases and without at the same time, substantially increasing the content of nitrogen oxide gases.

Various states as well as the United States Congress have been interested in the problem of air pollution caused by the operation of vehicular internal combustion engines. It has been estimated that the contaminants or pollutants emitted from the exhaust gases of average automobiles in this country in tons per year is about 12 of hydrocarbons, 66 of carbon monoxide, 6 of nitrogen oxides, 1 of sulfur dioxide and 1 of particulates, for a total of 86. There has been much work on various devices for reducing such pollutants in recent years, and minimum regulations have been set up. However, the need is for more effective and complete elimination of so-called air poisoners and, at a minimum of cost to the owners of vehicles.

Air has been injected into the exhaust manifold for the purpose of after-reacting unburned hydrocarbons and oxidizing or burning carbon monoxide gas into carbon dioxide gas. However, such an approach although practical, particularly from the standpoint of the hydrocarbons, has the disadvantageous feature of adding about 50% more of nitrogen oxides. For example, before the use of an afterburner, the nitrogen oxides have approached about 1000 parts per million but now approach about 1500 parts. Since air contains about 78% of nitrogen gas and since its reaction with oxygen is greatly accelerated at a temperature in the neighborhood of 3000° F., some means or procedure is needed to eliminate over-temperatures in the exhaust gases at the point of air injection.

It has been determined that when an engine is idlnig or is operating under low load conditions, the temperature of the gases may be below that required for an efficient and effective conversion of the hydrocarbons and carbon monoxide, thus making the after-reacting apparatus relatively ineffective at such a time. On the other hand, when the engine is operating under heavy load conditions, it has been determined that the temperatures reached greatly accelerate the formation of toxic nitrogen oxides and give a very short operating life to metal parts, such as the exhaust manifold, itself.

It has been an object of the invention to provide a practical and efficient procedure and apparatus for effectively controlling temperature on one side of a duel wall vessel or the like by varying the heat transferring effectiveness between one wall and an opposite wall by varying the density of gaseous medium between the walls.

Another object has been to meet the problem above outlined with reference to engine exhaust gas by controlling temperature factors in an expensive manner by means of procedure and apparatus that is effective as an over and under temperature control for engine exhaust gases to supply them downstream at a suitable temperature for controlled thermal reaction before discharge into the atmosphere.

Another object has been to provide an automatic, efficient and simplified method of controlling the heat of exhaust gases in an engine manifold prior to the injection of air thereto as by a conventional motor driven air pump or by a venturi system or unit such as herein illustrated.

Another object of the invention has been to provide temperature control means in an engine exhaust system which employs air injection downstream of the control means whereby conservation and dissipation of heat is enabled in the exhaust gases prior to their admixture with atmospheric air being introduced.

A further object of the invention has been to devise procedure and apparatus for effectively varying the density of gas under negative pressure within an enclosed chamber to control the temperature of engine exhaust gases flowing along one side of the chamber by varying density of the gas in accordance with variations in load operating conditions of the engine.

A still further object of the invention has been to devise an operating procedure and a suitable apparatus system for maintaining exhaust gases within a temperature range best suited for a maximum conversion of undesirable or noxious gas content thereof into a less noxious content and for minimizing any further forming of noxious content under a full range of operating conditions of an internal combustion engine.

These and other objects of the invention will appear to those skilled in the art from the drawing and the illustrated embodiment as described herein.

In the drawings:

FIG. 1 is a side elevation, partially fragmented and sectioned, illustrating an operating apparatus system construction and utilized in accordance with the invention.

FIG. 2 is a greatly reduced view in elevation taken along a side of an engine showing the construction and location of the apparatus employed in accordance with the invention.

The invention in its broader aspects deals with the use of a gaseous medium under variable pressure as a temperature controlling insulating means between dual walls of a jacketed vessel or housing. Control is accomplished by the employment of valve means for introducing gas under positive pressure into the jacketing for increasing the density of the gaseous medium therein and by the employment of bleeder means to remove gas therefrom to decrease the density of the gaseous medium remaining therein. In the embodiment shown, the valve means is sensitive to variations in pressure of air being supplied as a combustible input to an engine for varying density and thus heat conductivity of air within exhaust pipe jacketing. An aspect of the invention involves the concept of varying the density of a gaseous medium within an enclosed chamber or space to proportionately vary and control heat transference between opposed or inner and outer walls of a vessel.

To illustrate the invention from an important aspect thereof, it has been applied to the problem of maintaining the temperature of exhaust gases issuing from an internal combustion engine 10 within a controlled range for maximizing effective reacting or oxidizing of hydrocarbons and carbon monoxide and for minimizing the formation of nitrogen oxides. As applied to the problem of minimizing the deleterious content of the exhaust gas discharge from the internal combustion engine 10, exhaust manifold or pipe assembly 15, 20 is of dual wall construction to provide it with inner and outer wall portions separated by a jacketing space or chamber $a$ within which the density of air is varied or controlled by valve means 30, 40 that is operatively connected between the jacketing and an intake manifold.

More specifically, an automatic control valve unit 40 is balanced to normally maintain the chamber or jacketing $a$ closed off to the ambient atmosphere, but to open and permit the introduction of atmospheric air (see arrow $m$) and to cause an increase in pressure and a corresponding increase in gas density within the chamber when the engine load or speed is increased. The valve unit 40 normally maintains the chamber closed off with respect to the ambient atmosphere for retaining an attained gas density within the chamber $a$ until conditions change that require a change in temperature. The control valve unit 40 operates on the basis of an increase in pressure, whether in a negative or positive pressure zone, to momentarily permit the introduction of relatively cool, additional air into the chamber $a$ and, after such a puff-like introduction, to then again close the spacing off from the source of air supply. This is accomplished in such a manner that the air within the chamber $a$ will have a heat transfer capacity that is proportioned to decrease its density and increase its insulating effect when the engine load is low, and to increase its density, decrease its insulating effect and increase its heat transfer ability when the engine load is increased, all in such a manner as to maintain exhaust gas from the engine 10 within a proper temperature range for attaining desired reactions.

In carrying out the invention as applied to conventional internal combustion engine 10 that is represented by the dot and dash lines of FIG. 1 as a gasoline engine 10, a horizontally-cross-extending exhaust header 15 is shown connected in a conventional manner to individual exhaust manifolds 16, representing the number of cylinders of the engine 10, to receive and combine the exhaust gases from each of the combustion chambers. The header part 15 is shown centrally-connected to and integral with a downwardly-inclined exhaust manifold part 20 to deliver the hot gases thereto for passage to an after-reaction chamber A and then through a conventional muffler into the atmosphere. As shown, both the header part 15 and the exhaust manifold part 20 have integrally-connected inner wall portions 16 and 21 that are surrounded by outer wall-jacketing 17 and 22 to define a continuous fluid or jacket chamber $a$ aong and about the inner walls 16 and 21. The chamber or passageway $a$ extends about and longitudinally along the horizontal extent of the header part 15 and about and along the vertical extent of the manifold part 20. The jacket chamber or passageway $a$ has a port $b$ adjacent its upper end and an opposite port $c$ adjacent its lower end between which ambient or atmospheric air may be introduced.

In accordance with the invention, the jacket chamber $a$ becomes an air space containing air under low pressure and minimum density that serves as a highly effective insulating medium or heat retaining insulating means between the inner walls 16 and 21 and the cooperating outer walls 17 and 22 when the engine 10 is being operated under low load or idling conditions. On the other hand, when the engine 10 is under a heavy load and thus generating exhaust gases that are hotter and that may be at a faster rate, the chamber $a$ becomes an air space containing air under higher pressure and increased density that serves as a good heat transfer medium between the inner walls 16 and 21 and outer walls 17 and 22. As a result, means has been provided that enables the heat of the exhaust gases to be dissipated or to be conserved in such a manner as to maintain them as they are delivered to a reaction chamber A or like within a critical temperature range. The exhaust gases thus flow along a passageway that is provided with and whose temperature is controlled by a heat transfer environment that includes heat retaining insulating means.

An effective after-reaction or oxidizer device in the nature of a venturi is shown positioned in chamber A and connected to the outlet of the exhaust manifold 20 and is provided with side-positioned air intakes, see arrows $d$ and $d'$, for mixing with the hot exhaust gases and causing them to further oxidize in an after-reaction type of operation before they flow through a muffler (not shown) for exhaustion to the atmosphere. The venturi is illustrative of a more suitable type of device. The amount of air introduced or injected by the venturi is dependent on the pressure drop within its reactive zones which, in turn, depends upon the velocity of the exhaust gases that are passing therethrough. Thus, air may be supplied proportionately to the amount of exhaust gas content for a given period of operation that is to be further oxidized or after-reacted.

To make possible an efficient, automatic and accurate control of the operating temperature of the exhaust gases issuing from down-flow exhaust manifold part 20, a control system is provided which assures maintaining a temperature below a maximum that is critical from the standpoint of accelerated formation of nitrogen oxides, and a temperature above a minimum that is critical from the standpoint of an effective burning or oxidizing of hydrocarbons and carbon monoxide.

Referring to FIG. 1 in the drawings, the engine 10 is shown provided with a conventional air and fuel intake manifold 11 through which a mixture of air and fuel, such as gasoline or oil, from a carburetor or fuel pump may flow in the direction of the arrow $f$ into a horizontally-cross-extending intake header and, thence, into individual combustion chambers of the engine, as controlled by the valves thereof. A check valve 30 is, in accordance with the invention, positioned in a cross-connecting pipe or tubing line 31 that extends from a fitting 11a that is mounted in the intake manifold 11 and a fitting 17a that is mounted in a side extension portion of the exhaust header and manifold part assembly 15 and 20, so as to connect the port $b$ through the piping 31 and the check valve 30 with the inside of the intake manifold 11. The check valve 30 serves to positively prevent reverse flow from the intake manifold 11 to the port $b$, when, for example, there is a positive pressure force being exerted within the intake manifold 11. The valve 30, however, permits opposite fluid or gas flow in the direction of the arrow $g$ when a vacuum or negative pressure is being maintained within the manifold 11.

An automatic control valve unit 40 is provided and is shown connected to opposite or upper and lower ports $b$ and $c$ of the exhaust header and manifold construction and to a port $h$ of the intake manifold 11. By way of illustration, the control valve 40 has a cylindrical outer housing part 41 and a pair of opposed thread-mounted end caps 42 and 43, as well as an inner sleeve-like or cylindrical bearing part 45. A dual-head, cylindrical, floating piston or valve head 48 is operatively-mounted for sliding or back and forth movement within the inner part 45 and a longitudinally-extending operating chamber, and is normally retained in a centrally-balanced, neutral and air flow closing-off position therewithin, shown in FIG. 1, by means of a pair of opposed, end-positioned, spiral compression springs 49 and 50. The inner bearing part 45 is longitudinally-adjustably secured in position within the outer or enclosing housing part 41 by means of a headed adjustment screw or bolt 46.

The threaded stem of the screw 46 is adapted to cooperate with a threaded bore portion 45c of the bearing part 45. When the screw 46 is loosened, the inner part 45 may be slidably-adjusted with respect to the outer part 41 to the extent of the length of a slot 41c in the outer part 41', the screw 46 may be then tightened-down to retain such a position. The inner bearing part 45 also has an air inlet passage or cross-extending, side inlet port 45a and an opposed, transversely-aligned, air outlet passage or cross-extending, side outlet port 45b. Atmospheric or ambient air (see arrow m) may be introduced into the passageway or port 45a through a slotted opening 41a in the outer housing part 41. An annular groove, depression or recess 48a that is located midway of the length of the floating piston 48 serves to provide cross-flow passage for flowing air from inlet port 45a to outlet port 45b when the piston 48 is moved to the left in FIG. 1 until the recess 48a is in connecting alignment between the ports.

One head or operating chamber end of the control valve unit 40 is shown connected by a fitting 42a and pipe or tubing line 33 to a fitting 11b that is mounted in the intake manifold 11 and connected to its port h. The opposite or other head or operating chamber end of the valve unit 40 is connected through a fitting 43a, pipe or tubing line 34 and fitting 17b to the upper port b of the exhaust header and manifold construction or assembly 15, 20. The air outlet port 45b is connected by a fitting assembly 45c and pipe or tubing line 35 through a fitting 22a to the lower port c of the manifold 20. To permit relative adjustment between the cylindrical housing parts 41 and 45, the outer part 41 has a slotted portion 45c that extends longitudinally with respect to the fitting 45c and an opposed slotted portion 41a which permits air intake to the port 45a, irrespective of the adjusted positioning between the two housing parts.

When the accelerator pedal of the engine 10 is released or when the vehicle is going downhill under deceleration, a negative pressure of about 20 to 25 inches of mercury may be approached in the cross connection 31 (see arrow g). Since this same negative pressure is applied to line 33 (see arrow i), the fluid pressure force applied to opposite ends of the piston 48 of the valve 40 through the opposed piping 33 and 34 to opposite ends of the floating piston 11 will be equal and it will stay in its central position disclosed in FIG. 1. As a result, no atmospheric air or fluid will be introduced into the jacket chamber a. Since the front head portion of the floating piston 48 at this time closes-off the ports 45a and 45b, a maximum type of insulation or heat retention is accomplished from the standpoint of the jacketed assembly 15 and 20 of the gas exhaust parts that may represent about 60% retention of heat.

On the other hand, when the accelerator of the vehicle is pressed down to increase the speed of the engine or to compensate for a heavy load, the pressure in the intake manifold 11 tends to increase and move towards a positive pressure. However, an actual positive pressure only occurs in a supercharged conventional engine. As a result, a greater pressure is exerted in the direction of arrow j along the piping 33 and is applied to the right-hand end of the piston 48 against the opposed force exerted by the left-hand balancing spring 50 and a lesser pressure exerted in the direction of the arrow l. Since the check valve 30 closes or prevents any back fluid pressure flow along the piping 31 through piping 34 to the left-hand end of the piston 48, there is a resultant unequal pressure application on opposite ends of the floating piston 48 such that it tends to move to the left to a position in which its recessed portion 48a is aligned with the ports 45a and 45b. At this time, therefore, ambient air is introduced in the direction of the arrow m and flows in the direction of the arrow n along the piping 35 into the chamber a. Since atmospheric pressure is higher than that previously existing in chamber a and piping 34, air flow will be initiated through piping 31 and check valve 30 to equalize pressure within the chamber a with the pressure in the intake manifold 11; this causes a pressure equalization between opposite ends of the piston 48 and its return to the neutral position of FIG. 1, a which time, kow from the atmosphere through piping 35 is closed-off. Thus, the system is again stabilized, but with a higher fluid pressure and thus an increased fluid density existing in the chamber a.

When fluid pressure is lowered within the manifold 11 due to operation of the engine at a low load, air movement is in the direction of arrow i in line 33 and arrow g in line 31 to maintain a balancing of forces applied to opposite ends of the piston 48. Pressure in the chamber a is lowered due to air flow therefrom along line 31 in the direction of the arrow g; such flow continues until the pressure in the chamber a equals the lowered pressure of air within the manifold 11. Thus, during a period of idling or low load operation of the engine, air density is minimized within the chamber a and the dual wall vessel or assembly presents its maximum insulating or heat transfer resisting effect.

The control valve 40 is constructed and arranged to counter fluttering or surging movement during its operation and that may otherwise occur during abrupt changes in the nature of the pressure applied to the piping 33. It will be noted that under relative negative fluid pressure, as distinguished from relative positive fluid pressure, the flow through the piping lines 31, 33 and 34 is indicated by the arrows g, i and k. Thus, at this time, equal pressure is applied to opposite ends of the floating piston 48 such that it remains in its closed position. The system, in effect, provides a control of the heat gradient between the inner and outer walls of a dual wall vessel or port.

It will be apparent that the air being introduced as a temperature controlling fluid in the direction of the arrow n to the chamber a will be moving at a suitable rate based on the normal 14.7 p.s.i. pressure of the atmosphere. Under normal operation of a gasoline driven internal combustion engine 10, the negative pressure encountered in the piping line 31 may be in the neighborhood of 20 to 25 inches of mercury. For most efficient and effective operation to reduce the noxious gases to a minimum and prevent the forming of additional nitrogen oxides, the valve 40 is set to operate to maintain the gases exhausting from vessel part 20 within a range of about 1000° to 2000° F. Oxygen burning or reaction of the hydrocarbon content of the exhaust gases is found to start or occur at about 1000° F., as a minimum. The preferred operating range, however, is between about 1000° to 1800° F., with a temperature of about 1500° F. being about an optimum. The conversion of nitrogen in the exhaust gases into nitrogen oxides, particularly nitric oxide, nitrogen dioxide and the tetraoxide, begins above about 2000° F. and accelerates markedly from a temperature of about 3000° F. The thermal reactor of the system is represented by A and subsequent piping leading therefrom as supplied with exhaust gases within the indicated critical temperature range and as supplied with oxygen by the venturi drawing-in of air, as indicated by arrows d and d'.

It will be apparent that apparatus and procedure of the invention may be adapted for other types of fuel operated internal combustion engines, such as diesel and gas engines. A system or apparatus arrangement constructed in accordance with the invention has been found to enable operation within the desired temperature range irrespective of whether the engine is idling or is under load.

Although the herein illustrated and described system has been devised to illustrate a phase of the invention as applied to meet a problem arising in connection with engine exhaust gases, it is contemplated that principles of the invention may be applied to various problems, including the problem of temperature control of a space vehicle which, during its travel, is subjected on one side to relatively high radiant heat energy and on its opposite side to a relatively cold temperature, with rotation of the vehicle being used to somewhat equalize this temperature variation. That is, principles of the invention may be used to provide a space between inner and outer walls of the vehicle whose gaseous content has its density varied automatically to assure a comfortable range of temperature within the vehicle or along its inner wall and, without rotating the vehicle.

I claim:

1. In a method of maintaining the temperature of hot exhaust gases from an internal combustion engine within a critical range for after-thermal reaction wherein the engine has an intake manifold for introducing combustible gases thereto and an exhaust manifold for receiving hot exhaust gases therefrom, providing a jacketed wall about and along the exhaust manifold to define a temperature control spacing, varying the density of a gaseous atmosphere within the control spacing proportionately with the temperature of the exhaust gases by utilizing variations of gas pressure within the intake manifold to initiate and then close-off a direct positive pressure air flow from the atmosphere to the control spacing through one end thereof and provide a relatively high gas pressure therewithin under heavy load conditions of operation of the engine and, after the positive pressure air flow has been closed off, applying negative pressure from the intake manifold to the control spacing through an opposite end thereto to decrease heat conduction through the jacketed wall under low load conditions.

2. In a method as defined in claim 1, employing variations of gas pressure within the intake manifold to provide the exhaust gases with a temperature of between about 1000° to 2000° F., and then thermally reacting the exhaust gases to maximize elimination of noxious gases therefrom.

3. In a method as defined in claim 1, injecting air into the exhaust gases downstream of the exhaust manifold, and oxidizing the combustible gas content of the exhaust gases while restricting oxidation of the nitrogen content thereof.

4. In a method of maintaining a critical range of temperature for maximized effectiveness of thermal reaction to minimize the noxious content of hot exhaust gases from an internal combustion engine having a combustible gas inlet and a hot exhaust gas outlet, moving the exhaust gases along an enclosed outlet passageway defined by a jacketed wall containing a gaseous medium, while directly introducing air under atmospheric pressure to the gaseous medium and lowering the temperature of the exhaust gases to a temperature of below a maximum of 2000° F. when the engine is under load, and while moving gas from the gaseous medium into the combustible gas inlet of the engine to lower gas pressure within the jacketed wall and insulate the passageway for maintaining the temperature of the exhaust gases above about 1000° F. when the engine is under minimized load.

5. In an apparatus for after-reacting exhaust gases being generated by an internal combustion engine to minimize the content of noxious gases including nitrogen oxides, wherein an exhaust manifold is connected to the engine for receiving hot exhaust gases therefrom and a combustion gas intake manifold is connected to the engine for supplying combustion gases thereto; the exhaust manifold having a gas-receiving jacket means therealong and thereabout, thermal reactor means connected to an outlet end of the exhaust manifold, check valve means, means connecting one end of said jacket means to the intake manifold through said check valve means, said check valve means being adapted to, under a lowering of gas pressure within the intake manifold, enable gas flow from the one end of said jacket means into the intake manifold and to prevent any reverse flow therebetween, a control valve connected between an opposite end of said jacket means and the intake manifold, and said control valve having means adapted to close off gas flow between the intake manifold and the opposite end of said jacket means and adapted to, under an increase of gas pressure within the intake manifold, flow air directly from the atmosphere and under atmospheric pressure into the opposite end of said jacket means.

6. In an apparatus as defined in claim 5, means connecting said control valve to the one end of said jacket means for effecting a balanced closing action of said control valve after air under atmospheric pressure has been introduced into said jacket means.

7. In an apparatus as defined in claim 5, a thermal reactor connected downstream to said exhaust manifold, and said thermal reactor having an air-introducing venturi for oxidizing hydrocarbon and carbon monoxide content of the exhaust gases downstream of the exhaust manifold.

8. In apparatus for after-reacting exhaust gases being generated by an internal combustion engine to minimize the content of noxious gases including nitrogen oxides, an exhaust manifold for connection to the engine to receive hot exhaust gases therefrom, said exhaust manifold having fluid jacket means therealong and thereabout, reactor means connected to an outlet end of said exhaust manifold, control means for increasing the pressure-density of the fluid along said jacket means when the temperature of exhaust gases generated by the engine is above a maximum that facilitates the production of nitrogen oxides and for decreasing the pressure-density of said jacket means and employing it as an efficient heat-retaining insulating means when exhaust gases generated by the engine approach a minimum temperature below which after-reaction of combustible gases is hindered, an intake manifold for supplying a mixture of fuel and air connected to the engine, said control means being connected to the intake manifold and being operated by lower pressure within the intake manifold to lower the pressure of fluid along said jacket means, said control means being also operated by an increased pressure in the intake manifold to initiate introduction of additional fluid into and an increased of fluid pressure within said jacket means, said jacket means comprising spaced-apart wall jacketing about said exhaust header defining a jacket chamber; said control means being a valve unit having an operating chamber therein, a floating piston within said operating chamber, means for normally maintaining said piston in a balanced neutral position within the operating chamber, a fluid inlet port to said valve unit, a fluid outlet port in said valve unit connected to one end of said jacket chamber, and said inlet and outlet ports being closed off by said piston when in its neutral position; a fluid connection from one end of the operating chamber of said valve unit to an opposite end of said jacket chamber, a fluid connection from an opposite end of the operating chamber of said valve unit to the intake manifold, a check valve, and a fluid connection through said check valve between the intake manifold and the opposite end of said jacket chamber for restricting flow between the intake manifold and said jacket chamber to flow towards the intake manifold.

9. In apparatus as defined in claim 8, an exhaust header leading from cylinders of the engine and integrally connected to said exhaust manifold, and said fluid jacket means having spaced-apart jacketing along and about said exhaust header that defines a continuous jacket chamber with the jacketing along and about said exhaust manifold.

10. In a temperature control apparatus for an internal combustion engine having an intake manifold and an exhaust manifold, a dual wall about the exhaust manifold defining a hollow jacket chamber therealong and thereabout, a control valve unit, said valve unit having a longitudinal operating chamber and a balanced floating valve head operatively-mounted therein for endwise back and forth movement, an ambient air inlet port and an air outlet port in opposed transverse positions in said valve unit, means biasing said floating valve head towards a closing-off position with respect to said air inlet and outlet ports, piping connecting said outlet port to one end of said jacket chamber, means connecting one end of said operating chamber to an opposite end of said jacket chamber, means for connecting an opposite end of said operating chamber to the intake manifold, a check valve, means connecting the opposite end of said jacket chamber through said check valve to the intake manifold for air flow towards the intake manifold, said floating valve head having a recess portion therein defining an air passageway, said valve head being operated to bypass air from said inlet port along said air passageway to said outlet port when a pressure is exerted on one end of said operating chamber against said floating valve head through the connection to the intake manifold that is greater than the pressure exerted on the opposite end of said operating chamber, and said valve head being adapted to move to a closing-off position with respect to cooling air flow along said air passageway when substantially equal pressure is applied from the intake manifold to opposite ends of said operating chamber for closing off air flow to said jacket chamber.

References Cited

UNITED STATES PATENTS

| | | | |
|---|---|---|---|
| 3,270,802 | 9/1966 | Lindberg | 165—135 |
| 3,450,196 | 6/1969 | Bauer | 165—32 |
| 3,457,723 | 7/1969 | Kerns | 60—29 |

DOUGLAS HART, Primary Examiner

U.S. Cl. X.R.

165—32, 96

PO-1050
(5/69)

UNITED STATES PATENT OFFICE
CERTIFICATE OF CORRECTION

Patent No. 3,606,753          Dated September 21, 1971

Inventor(s) Robert C. La Force

It is certified that error appears in the above-identified patent and that said Letters Patent are hereby corrected as shown below:

Column 1, line 17, correct the spelling of "method".

Column 3, line 59, correct the spelling of "along".

Column 5, line 33, change "45c" to --41b--.

Column 6, line 6, change "kow" to --flow-- and before "which" change "a" to --at--.

Column 8, line 42, change "increased" to --increase--.

Signed and sealed this 7th day of March 1972.

(SEAL)
Attest:

EDWARD M. FLETCHER, JR.
Attesting Officer

ROBERT GOTTSCHALK
Commissioner of Patents